United States Patent Office 2,976,289
Patented Mar. 21, 1961

2,976,289

1,2,3,4-TETRAHYDRO - 7 - HALO - 6 - SULFAMYL-4-QUINAZOLINONES AND 7-TRIFLUOROMETHYL ANALOGUES

Elliott Cohen, Mount Vernon, and James R. Vaughan, Jr., New City, N.Y., assignors to American Cyanamid Company, New York, N.Y., a corporation of Maine No Drawing. Filed June 30, 1959, Ser. No. 823,806

11 Claims. (Cl. 260—256.5)

This invention relates to 1,2,3,4-tetrahydro-7-halo-6-sulfamyl-4-quinazolinones and 7-trifluoromethyl analogues and to a process of preparing them. The compounds have the following formula:

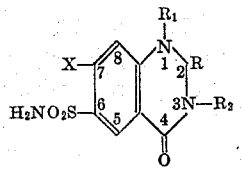

in which R is dihydro, hydrogen and lower alkyl or double bonded oxygen, $R_1$ is hydrogen or lower alkyl, $R_2$ is hydrogen or lower alkyl and X is halogen or trifluoromethyl.

A number of the quinazolinones corresponding to the above formula but in which the heterocyclic ring is aromatic were invented by Frederick Charles Novello and described and claimed in United States application Serial No. 710,386, filed January 2, 1958. The corresponding South African application 82/59, filed April 10, 1959, now Patent 82/59, August 6, 1959. This application is published in the April 29, 1959 Union of South African Patent Journal and is open to public inspection, including the above United States application. The quinazolinones invented by Novello are stated by him to have diuretic activity and to aid in the excretion of sodium and chloride ions. The statement is true but the compounds also cause the excretion of serious amounts of potassium, which is a disadvantage because of the danger of potassium depletion and shock on prolonged use. The diuretic activity is also only a small fraction of that of the corresponding reduced compounds of the present invention which have the advantage of causing only a mild kaluresis. Both the Novello compounds and those of the present invention have the advantage that they excrete sodium and chloride rather than bicarbonate ions and therefore do not suffer the disadvantage of producing acidosis in patients taking these drugs.

Most of the compounds of the present invention, with the exception of those in which R is double bonded oxygen, are prepared by reducing the correspondnig quinazolinones, which are known compounds as explained above. A typical equation as applied to 7-chloro-6-sulfamyl-4-quinazolinone is as follows:

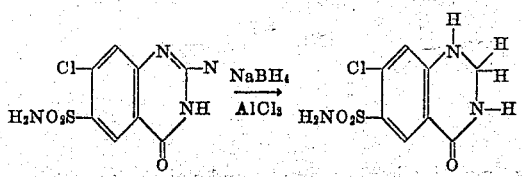

Not only are the tetrahydro quinazolinones of the present invention very effective as diuretics as described above, but they have low toxicity and do not have any of the highly undesirable properties of the mercurial diuretics, which were the classical chloruretic agents of the past.

The invention will be described in greater detail in conjunction with the following specific examples.

EXAMPLE 1

7-chloro-6-sulfamyl-1,2,3,4-tetrahydro-4-quinazolinone

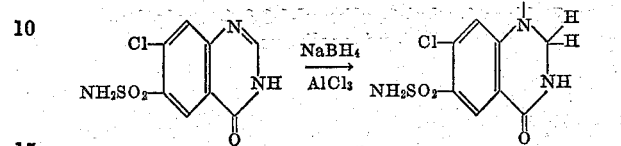

7-chloro-6-sulfamyl-4-quinazolinone is prepared as described in Example 1 of the Novello South African Patent 82/59 referred to above.

For preparation of the desired tetrahydroquinazolinone, 103 parts of aluminum chloride were added to 25,000 parts by volume of diethylene glycol dimethyl ether while cooling in an ice bath. The mixture was then stirred with warming and 200 parts of 7-chloro-6-sulfamyl-4-quinazolinone added. A second solution of 140 parts of sodium borohydride in 7000 parts of dry diethylene glycol dimethyl ether was then added gradually. An orange mixture resulted which was kept at 85° C. until the reaction was complete. The reaction mixture was then cooled to approximately 0° C. and 4000 parts of water slowly added. Dilute HCl was then added to form a strongly acidic clear solution which was evaporated to dryness. The solid was triturated with cold water to yield 90 parts of a solid which on recrystallization from 50% aqueous acetone gave pale yellow crystals. A second recrystallization gave needle crystals.

EXAMPLE 2

7-chloro-2-methyl-6-sulfamyl-1,2,3,4-tetrahydro-4-quinazolinone

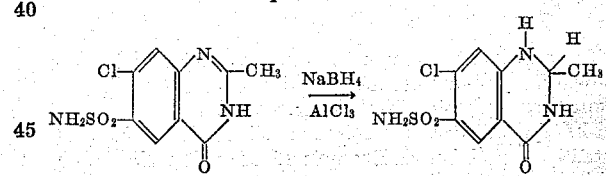

The procedure of Example 1 was repeated except that a corresponding amount of 7-chloro-2-methyl-6-sulfamyl-4-quinazolinone was used for the 7-chloro-6-sulfamyl-4-quinazolinone. The crude product obtained was stirred with aqueous sodium bicarbonate solution, filtered off and the solid dissolved in 1 N aqueous NaOH and reprecipitated with dilute hydrochloric acid. As before, recrystallization from 50% aqueous acetone and 50% ethanol resulted in a well crystallized product.

The 7-chloro-2-methyl-6-sulfamyl-4-quinazolinone can be prepared by eliminating Step C of Example 1 of the Novello South African patent and using urethane in stoichiometrically equivalent amounts instead of formamide in Step D.

EXAMPLE 3

7-chloro-3-methyl-6-sulfamyl-1,2,3,4-tetrahydro-4-quinazolinone

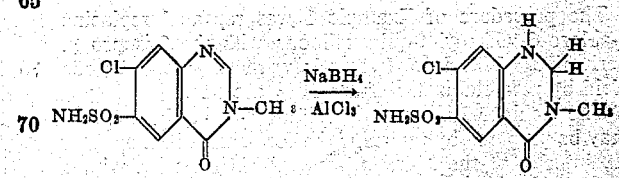

The procedure of Example 1 was repeated replacing the 7-chloro-6-sulfamly-4-quinazolinone with an equivalent amount of the 3-methyl derivative.

A good yield of plate crystals was obtained on recrystallization from 50% acetone.

The 7-chloro-3-methyl-6-sulfamyl-4-quinazolinone may be prepared by replacing the formamide in Step D of Example 1 of the Novello South African patent with a stoichiometrical equivalent amount of N-methylformamide.

EXAMPLE 4

*7-chloro-2-ethyl-6-sulfamyl-1,2,3,4-tetrahydro-4-quinazolinone*

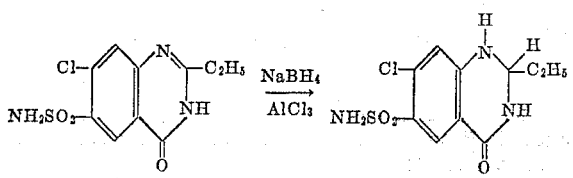

The procedure of Example 1 was repeated replacing the 7-chloro-6-sulfamyl-4-quinazolinone with the 2-ethyl derivative. Fibrous crystals were obtained by recrystallization from 50% acetone.

The 7-cholor-2-ethyl-6-sulfamyl-4-quinazolinone may be made by replacing the 5-chloro-2-methylacetanilide in Step B of the Novello Example 1 referred to above with a stoichiometrical equivalent amount of 5-chloro-2-methylpropionanilide, eliminating Step C and replacing the formamide in Step D with a stoichiometrical equivalent of urethane.

EXAMPLE 5

*7-fluoro-6-sulfamyl-1,2,3,4-tetrahydro-4-quinazolinone*

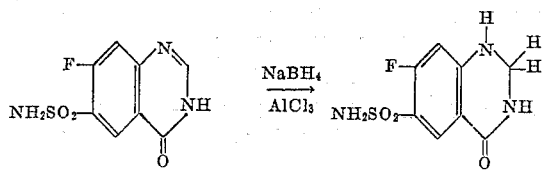

The process of Example 1 is repeated replacing 7-chloro-6-sulfamyl-4-quinazolinone with the corresponding 7-fluoro-6-sulfamyl-4-quinazolinone.

The 7-fluoro-6-sulfamyl-4-quinazolinone may be prepared by the method of Example 15 of the Novello South African patent.

EXAMPLE 6

*7-chloro-2-isopropyl-6-sulfamyl-1,2,3,4-tetrahydro-4-quinazolinone*

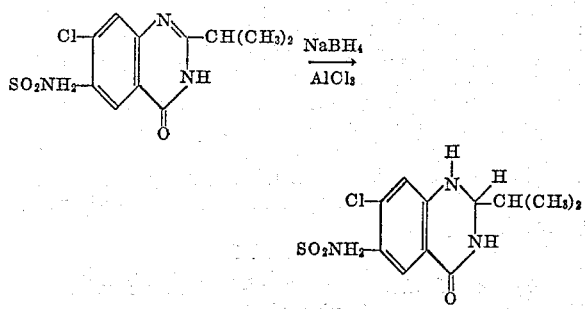

The procedure of Example 1 was repeated replacing 7-chloro-6-sulfamyl-4-quinazolinone with the 2-isopropyl derivative. The fibrous crystals were obtained in good yield by recrystallization from 50% acetone.

The 7-chloro-2-isopropyl-6-sulfamyl - 4 - quinazolinone may be prepared by replacing the formamide in Step D of Example 1 of the Novello South African patent with a stoichiometrical equivalent amount of isobutyramide.

EXAMPLE 7

*7-chloro-2,3-dimethyl-6-sulfamyl-1,2,3,4-tetrahydro-4-quinazolinone*

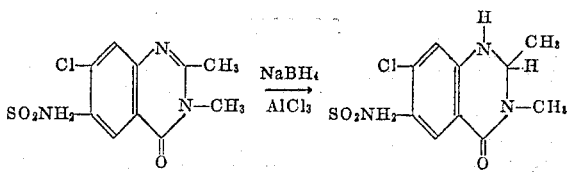

The procedure of Example 1 was repeated replacing 7-chloro-6-sulfamyl-4-quinazolinone with the 2,3-dimethyl derivative. A good yield of plate crystals was obtained by recrystallization from 50% acetone.

The 7-chloro-2,3-dimethyl-6-sulfamyl-4-quinazolinone may be prepared by replacing the formamide in Step D of Example 1 of the Novello South African application with a stoichiometrical equivalent amount of N-methylacetamide.

EXAMPLE 8

*Preparation of 7-chloro-2-oxo-6-sulfamyl-1,2,3,4-tetrahydro-4-quinazolinone*

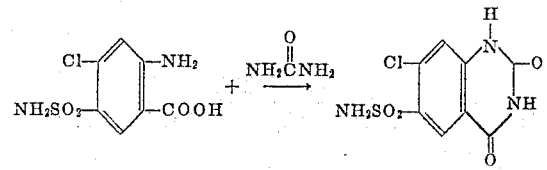

One part of 4-chloro-5-sulfamyl anthranilic acid was heated with 1 part of urea at 180° C. until reaction was complete as evidenced by cessation of evolution of ammonia. The mixture was then cooled, the unreacted starting material was dissolved in 10% aqueous sodium bicarbonate solution, filtered and the remaining solid recrystallized by dissolving in alkali, clarifying with decolorizing carbon and precipitation by acidification.

The 4-chloro-5-sulfamylanthranilic acid may be prepared by following Steps A, B and C of Example 1 of the Novello South African patent.

It should be noted that the 1,2,3,4-tetrahydroquinazolinones are capable of existing in tautomeric form. They are shown for typical members by the following equilibrium reactions:

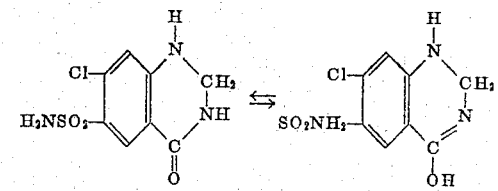

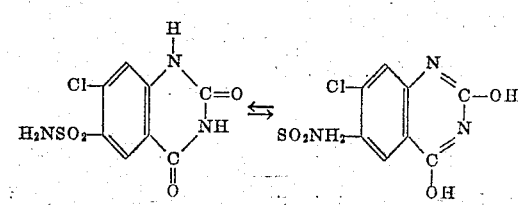

For simplicity, in the examples and claims, the compounds have been set forth in their keto instead of their enol form.

This application is in part a continuation of our co-pending application Serial No. 804,567, filed April 7, 1959, now abandoned.

We claim:
1. A compound of the formula:

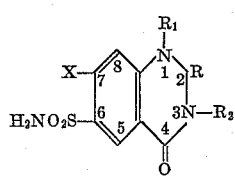

in which X is selected from the group consisting of halogen and trifluoromethyl, R is selected from the group consisting of

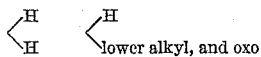

$R_1$ is selected from the group consisting of hydrogen and lower alkyl and $R_2$ is selected from the group consisting of hydrogen and lower alkyl.

2. A compound having the formula:

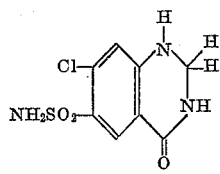

3. A compound having the formula:

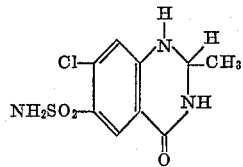

4. A compound having the formula:

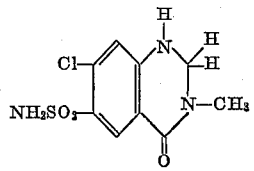

5. A compound having the formula:

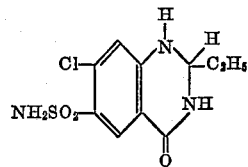

6. A compound having the formula:

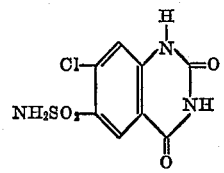

7. A compound having the formula:

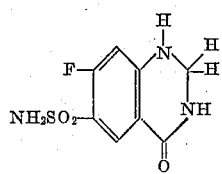

8. A compound having the formula:

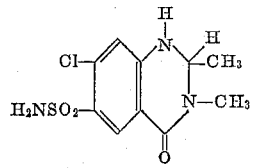

9. A compound of the formula:

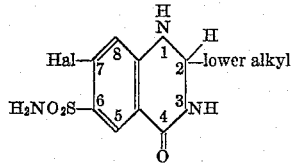

10. A compound of the formula:

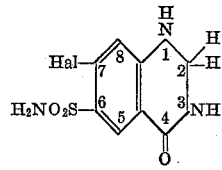

11. A compound of the formula:

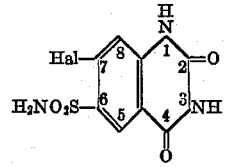

References Cited in the file of this patent

FOREIGN PATENTS 535,449    Canada _____ Jan. 8, 1957

OTHER REFERENCES

Sheibley: Jour. Org. Chem., vol. 12, pages 743–751 (1947).